July 11, 1961 R. J. ROBBINS 2,992,321
SAFETY LIGHT FOR TRAILERS, TRUCKS, AND THE LIKE
Filed April 24, 1959 2 Sheets-Sheet 1
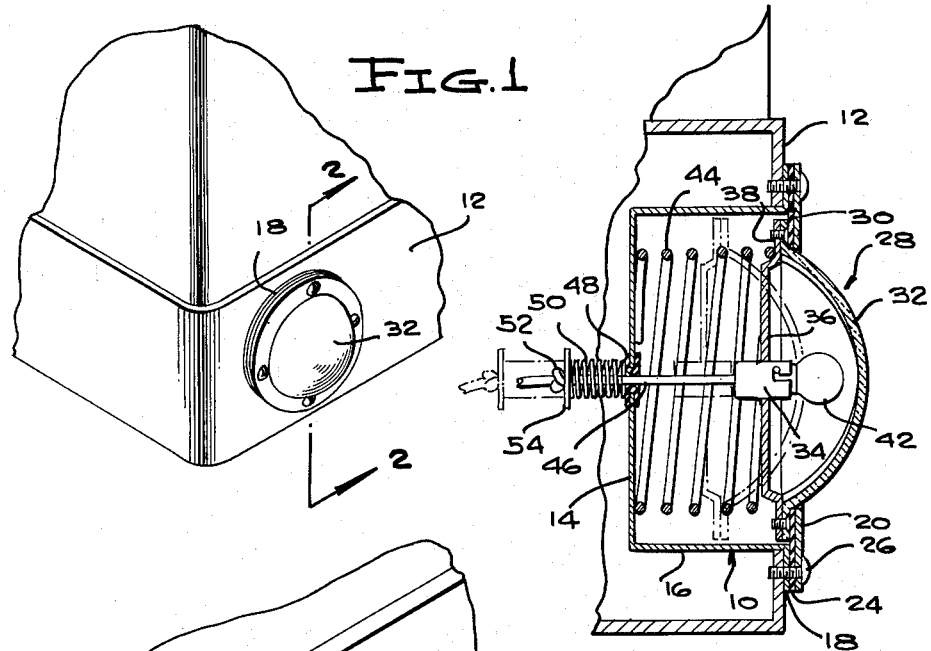
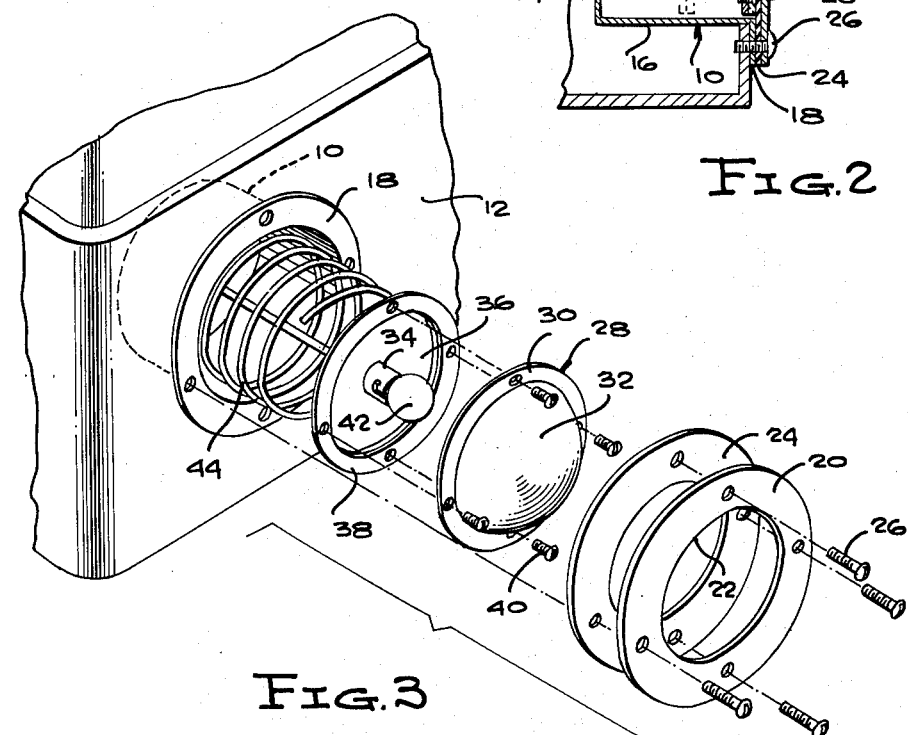
INVENTOR.
ROBERT J. ROBBINS
BY
McMorrow, Berman & Davidson
ATTORNEYS July 11, 1961
R. J. ROBBINS
2,992,321
SAFETY LIGHT FOR TRAILERS, TRUCKS, AND THE LIKE
Filed April 24, 1959
2 Sheets-Sheet 2
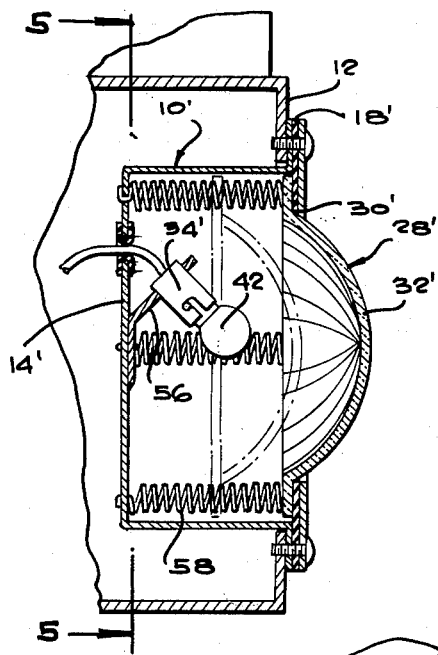
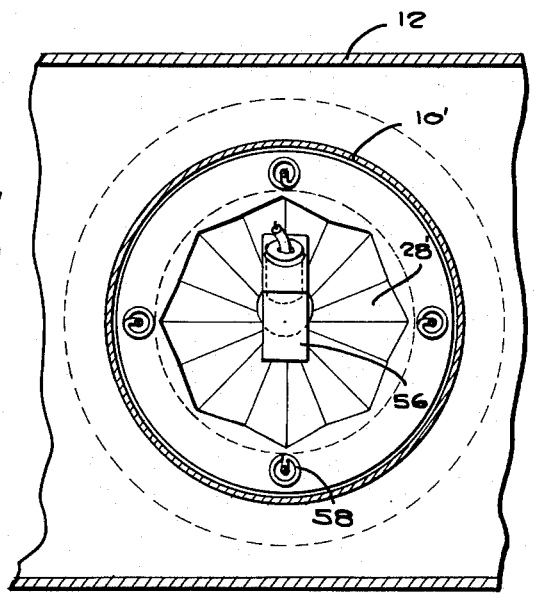
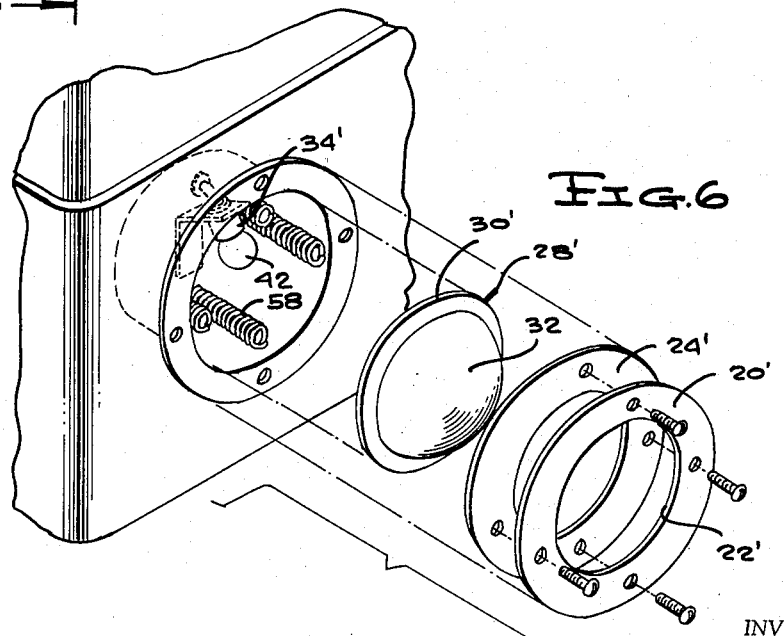
INVENTOR.
ROBERT J. ROBBINS
BY
*McMorrow, Berman & Davidson*
ATTORNEYS

United States Patent Office 2,992,321
Patented July 11, 1961

2,992,321
SAFETY LIGHT FOR TRAILERS, TRUCKS AND THE LIKE
Robert J. Robbins, Lowell, Ind.
(401 N. Michigan Ave., Greensburg, Ind.)
Filed Apr. 24, 1959, Ser. No. 808,826
5 Claims. (Cl. 240—7.1)

The present invention relates generally to a safety light for a trailer or truck, and in particular to a light having mounting means designed to yield under pressure applied thereto, so as to permit the mounting to retract into the body of the trailer or truck to avoid breakage due to such pressure.

Trailers and trucks having tail lights and clearance lights on their rear ends and side walls, respectively, frequently cause such lights to be broken when the trailer or truck is backed up or moved to a position with the side walls in close contact with a post or other object. The breakage results from the fact that such lights are conventionally mounted so that they will not yield under pressure, and breakage occurs when the pressure becomes too great.

An object of the present invention is to provide a safety light for a trailer or truck which lends itself to retractile movement into the body of the trailer or truck when pressure is applied thereto.

Another object of the present invention is to provide a safety light for a trailer or truck which, while being retractible into the body of the trailer or truck upon application of pressure thereto, normally projects exteriorly of such trailer or truck body in such a manner as to be visible from many directions.

A further object of the present invention is to provide a safety light for a trailer or truck which is readily mountable in a trailer or truck body, one which is simple in structure, one which is sturdy in construction and fabricated of few parts, and one which is economically feasible.

These and other objects and advantages will be fully apparent from the following description when taken in connection with the annexed drawings, in which:

FIGURE 1 is a fragmentary isometric view of a corner of a trailer or truck body, showing the safety light according to the present invention installed therein, FIGURE 2 is a sectional view of an enlarged scale taken on line 2—2 of FIGURE 1, FIGURE 3 is an exploded isometric view of the components of the safety light according to the present invention, FIGURE 4 is a sectional view of a modified form of the safety light of the present invention, FIGURE 5 is a view partially in section taken on the line 5—5 of FIGURE 4, and FIGURE 6 is an exploded isometric view of the components of the invention shown in FIGURES 4 and 5.

Referring in greater detail to the drawings, in which like numerals indicate like parts throughout the several views, the safety light, according to the present invention, comprises a housing 10 adapted for installation in an opening in a wall, such as the wall of a trailer or truck body shown in FIGURES 1 to 3 inclusive, and designated generally by the reference numeral 12. The housing 10 has a back wall 14 and a side wall 16 extending about the perimeter of the back wall 14 and has an open front. When the housing 10 is mounted in the wall 12, the open front of the housing 10 is positioned so as to face out of the opening in the wall 12 with the back wall 14 and side wall 16 entirely within the opening in the wall 12.

A flange 18 extends about the side wall 16 of the housing 10 adjacent the front end of the latter and is adapted to abut against a portion of the wall 12 contiguous to the opening therein. A mounting plate 20 is provided with an aperture 22 having an area less than that of the open front of the housing 10 and is adapted to be positioned exteriorly of and in abutting relation with respect to the flange 18 with a resilient annular member 24 interposed therebetween. Self-tapping metal working screws 26 constitute means for affixedly securing the mounting plate 20 and the flange 18 together with the annular member 24, to the portion of the wall 12 contiguous to the opening therein.

A lens, designated generally by the reference numeral 28, embodying a rim 30 and a semispherical portion 32 projecting outwardly of the rim 30, is positioned so that the semispherical portion 32 projects freely through and outwardly of the plate aperture 22 with the rim 30 within the open front of the housing 10.

An incandescent lamp socket 34 is fixedly supported upon a plate 36, centrally thereof, the plate 36 being dish-shaped with its peripheral portion 38 fixedly secured by means of screws 40 to the rim 30 of the lens 28. An incandescent lamp bulb 42 is carried by the socket 34 in such a way as to face toward the semispherical portion 32 of the lens 28.

Resilient yielding means embodying a coil spring 44 is positioned within the housing 10 and interposed between and operatively connected to the rim 30 of the lens 28 and to the back wall 14 of the housing 10. The spring 44 is tensioned to normally bias the rim 30 of the lens 28 toward the mounting plate 20. The raised peripheral portion 38 of the plate 36 forms a support for the adjacent end of the coil spring 44, as shown in FIGURE 2.

The shell of the bulb 42 is grounded through the socket 34 to the vehicle frame and a single wire 46 has one end in electrical contact with the base contact of the bulb 42, such construction being conventional, and not shown in detail herein. The wire 46 extends through a grommet 48 seated in an aperture provided in the back wall 14 and a coil spring 50 is circumposed about the adjacent portion of the wire 46 with a knot 52 formed in the wire holding the coil spring 50 in compressed condition when the coil spring 44 is in its expanded position. A washer 54 is interposed between the one end of the coil spring 50 and the knot 52.

Upon application of an externally directed force to the spherical lens portion 32, the lens 28 and plate 36, carrying the bulb 42, will be shifted toward the back wall 14 of the housing 10 against the restraint of the spring 44, the spring 50 expanding and holding the wire 46 in untangled taut condition without flexing in the portion which is between the knot 52 and the socket 34.

In FIGURES 4 to 6 inclusive, a modified form of the invention is shown in which the housing 10' has a back wall 14' on which is fixedly secured an angularly directed bracket 56 carrying a socket 34'. The bracket 56 mounts the bulb 42 securely on the back wall 14'.

A plurality of spaced coil springs 58 are positioned within the housing 10' and have their one ends fixedly secured in the back wall 14'. The other ends of the springs 58 are free and bear against the rear face of the rim 30' of a lens 28' having a semispherical portion 32' projecting outwardly of the rim 30'. A mounting plate 20' having an aperture 22' is superimposed over a resilient annular member 24' with the aperture 22' being of a lesser area than the open front of the housing 10'. The semispherical portion 32' of the lens 28' projects through the annular member 24' and the mounting plate 20' and is held in the projected position by the resilient yielding means, the springs 58.

In use, the safety light of the present invention, in each of the embodiments above shown and described, is mounted in an opening in the wall 12 of a trailer or truck body with the flange 18 or 18' overlying the portion of the wall adjacent the opening therein. The lens 28 and 28' is next positioned, so that the semispherical portion 32 or 32' is exteriorly of the wall 12. The annular member 24 or 24' and the mounting plate 20 or 20' is then slipped over the lens portion 32 or 32' and secured to the wall 12.

Upon the application of any externally applied force to the semispherical portion 32, 32' the lens 28, 28' will yieldingly retract into the housing 10, 10' and after the removal of such externally applied force, the lens and associated bulb 42, in the first embodiment shown in FIGURES 1 to 3, will return to the position exteriorly of the wall. In the embodiment shown in FIGURES 4 to 6, inclusive, only the lens 28' moves inwardly and outwardly of the wall 12 against the resistance of the springs 58, the bulb plate maintaining its fixed position attached to the wall 14'.

While only preferred embodiments of the present invention have been shown and described, other embodiments are contemplated and numerous changes and modifications may be made therein without departing from the spirit of the invention as set forth in the appended claims.

What is claimed is:

1. In a lamp device for installation in an opening in a wall, a housing having a back wall with a side wall extending about the perimeter of said back wall, and having an open front adapted to be positioned so that the back wall and side wall are within said opening with the open front facing out of said opening, a flange extending about said side wall adjacent the open front and adapted to abut against the portion of said wall contiguous to said opening, a mounting plate provided with an aperture of an area less than that of the open front of said housing positioned exteriorly of and in abutting relation with respect to said flange, a resilient annular member interposed between said flange and mounting plate, means fixedly securing said mounting plate, annular member, and flange to the portion of said wall contiguous to said opening, a lens embodying a rim and a semispherical portion projecting outwardly of said rim positioned so that the semispherical portion projects freely through and outwardly of said mounting plate aperture with the rim within the open front of said housing, lamp means disposed within said housing and facing toward said semispherical lens portion, and resilient yielding means within said housing interposed between and operatively connected to said rim and said housing back wall and tensioned to normally bias said rim toward said mounting plate, said semispherical lens portion upon application of an externally directed force thereto being shifted toward the back wall of the housing against the restraint of said yielding means.

2. The lamp device according to claim 1 in which the lamp means is fixedly supported in said housing.

3. The lamp device according to claim 1 in which the lamp means is fixedly supported in a bracket carried by the housing back wall.

4. The lamp device according to claim 1 in which the lamp means is connected to said lens for movement with the latter.

5. The lamp device according to claim 1 in which the lamp means is fixedly supported in a plate fixedly attached to the lens rim.

References Cited in the file of this patent

UNITED STATES PATENTS

| 2,685,639 | Wiley | Aug. 3, 1954 |
| 2,686,868 | Diedring | Aug. 17, 1954 |
| 2,804,539 | Robbins | Aug. 27, 1957 |
| 2,809,283 | Spencer | Oct. 8, 1957 |

FOREIGN PATENTS

| 807,477 | Germany | June 28, 1951 |